(12) United States Patent
Ligon, Sr. et al.

(10) Patent No.: US 6,398,997 B1
(45) Date of Patent: Jun. 4, 2002

(54) METHOD OF EXTRUDING THERMOPLASTIC ELASTOMER FOAM USING WATER AS A BLOWING AGENT

(75) Inventors: James T. Ligon, Sr., Almont; Matthew P. Macker, Emmett; Christopher A. Burkland, Almont; Jeffrey L. Hana, Metamora; Kurt Schwarzwalder, Macomb Twp., all of MI (US)

(73) Assignee: Ligon Brothers Manufacturing Company, Almont, MI (US)

( * ) Notice: Subject to any disclaimer, the term of this patent is extended or adjusted under 35 U.S.C. 154(b) by 0 days.

(21) Appl. No.: 09/503,312

(22) Filed: Feb. 14, 2000

Related U.S. Application Data

(63) Continuation-in-part of application No. 09/133,995, filed on Aug. 14, 1998, now Pat. No. 6,110,404.

(51) Int. Cl.[7] .............................................. B29C 44/20

(52) U.S. Cl. .......................................... 264/53; 264/51

(58) Field of Search ............................... 264/50, 53, 51

(56) References Cited

U.S. PATENT DOCUMENTS

| | | |
|---|---|---|
| 3,824,139 A | 7/1974 | Gareth |
| 3,940,467 A | 2/1976 | Brachman |
| 4,104,207 A | 8/1978 | Pelikan et al. |

(List continued on next page.)

OTHER PUBLICATIONS

Suzorite® Publication (Description of Mica Flake and its uses–4pages) (undated).
Customer Report: Santoprene® Thermoplastic Rubber, Foaming Santoprene®Rubber. Monsanto (18 pages) (undated).
Technical Note: Santoprene® Thermoplastic Rubber, Extrusion Foaming Technology for Santoprene® Thermoplastic Rubber. TPE–71–01 (12 Pages) (Copyright, 1986).
Technical Note: Santoprene®Thermoplastic Rubber, Extrusion Processing of Santoprene®Thermoplastic Rubber. Monsanto TPE–18–01 (12 sheets, Copyright 1985).
Technical Note: Santoprene®Thermoplastic Rubber, Extrusion Foaming Technology for Santoprene®Thermoplastic Rubber (Revised). Monsanto (16 sheets total) (undated).
Technical Correspondence: Santoprene®Thermoplastic Rubber, Extrusion Foam Technology for Santoprene Thermoplastic Rubber Monsanto. May 10, 1987 (18 sheets total).
Cellular Solids, Structures and Properties: Lorna J. Gibson and Michael F. Ashby; Pergamon Press. Copyright 1988, p. 4 (3 sheets total).
Handbook of Thermoplastic Elastomers, Second Edition. Benjamin M. Walker and Charles P. Rader; Van Nostrand Reinhold Company, pp. 126,128, Copyright 1979 (4 sheet total).

(List continued on next page.)

Primary Examiner—Allan R. Kuhns
(74) Attorney, Agent, or Firm—Dykema Gossett PLLC

(57) ABSTRACT

A method for extruding foam of a thermoplastic elastomer, which is a blend of olefin rubber and polyolefin resin, includes the steps of mixing the thermoplastic with water, introducing the mix to an extruder, melting and compressing the thermoplastic elastomer and water and extruding the resultant mix as foam. In more detail, a first quantity of thermoplastic elastomer in pellet form is mixed with a second quantity of water. The mixed water and thermoplastic elastomer is introduced to an extruder. The thermoplastic elastomer is allowed to soak for a predetermined period of time after mixing. The thermoplastic elastomer is melted and mixed with the water to a uniform mix of thermoplastic elastomer and water. The mix is extruded through a die, wherein the water expands in a vapor form to create foam cells with the cells having walls of the thermoplastic elastomer.

8 Claims, 4 Drawing Sheets

U.S. PATENT DOCUMENTS

| | | |
|---|---|---|
| 4,124,336 A | 11/1978 | Johnson |
| 4,130,535 A | 12/1978 | Coran et al. |
| 4,179,540 A | 12/1979 | Smarook |
| 4,278,767 A | 7/1981 | DiGiulio et al. |
| 4,278,768 A | 7/1981 | DiGiulio et al. |
| 4,311,628 A | 1/1982 | Abdou-Sabet et al. |
| 4,312,958 A | 1/1982 | DiGiulio et al. |
| 4,323,655 A | 4/1982 | DiGiulio et al. |
| 4,409,365 A | 10/1983 | Coran et al. |
| 4,455,272 A | 6/1984 | Schubert et al. |
| 4,517,316 A | 5/1985 | Mason |
| 4,593,062 A | 6/1986 | Puydak et al. |
| 4,657,715 A | 4/1987 | Myers et al. |
| 4,729,807 A | 3/1988 | Hede et al. |
| 4,898,760 A | 2/1990 | Halberstadt et al. |
| 5,070,111 A | 12/1991 | Dumbauld |
| 5,130,340 A | 7/1992 | Allen et al. |
| 5,393,796 A | 2/1995 | Halberstadt et al. |
| 5,475,035 A | 12/1995 | Park et al. |
| 5,489,407 A | 2/1996 | Suh et al. |
| 5,512,601 A | 4/1996 | Halberstadt et al. |
| 5,604,266 A | 2/1997 | Mushovic |
| 5,605,937 A | 2/1997 | Knaus |
| 5,607,629 A | 3/1997 | DeMello et al. |
| 5,654,346 A | 8/1997 | Halberstadt et al. |
| 6,110,404 A * | 8/2000 | Ligon, Sr. et al. ............ 264/50 |

OTHER PUBLICATIONS

Modern Plastics Mid–October Encyclopedia Issue "Foaming Agents", Mid–Oct. 1990 Issue, vol. 67, No. 11. pp. 184, 185, 187, 188, 291, 292. Copyright 1990 McGraw Hill (7 sheets.

Technology News 'Foam Extrusion Technology for TP Elastomer'; Plastics Technology, Feb. 1987, p. 23. (1 sheet total).

Plastics Exrusion Technology Handbook by Sidney Levy. Industrial Press, Inc. Chapter Eight. P. 189–201. Copyright 1981. (9 sheets total).

Technology News 'Foam Extrusion Technology for TP Elastomer'; Plastics Technology, Feb. 1997. (2 sheets total).

* cited by examiner

METHOD OF EXTRUDING THERMOPLASTIC ELASTOMER FOAM USING WATER AS A BLOWING AGENT

This is a continuation-in-part of application Ser. No. 09/133,995 filed Aug. 14, 1998, now U.S. Pat. No. 6,110,404.

FIELD OF THE INVENTION

The present invention is directed to a method of extruding thermoplastic elastomer foam using water as a blowing agent. More particularly, the present invention is directed to a method for extruding thermoplastic elastomer foam in which the water and the thermoplastic elastomer are introduced to an extruder simultaneously.

BACKGROUND OF THE INVENTION

It is known to use water as a mechanical blowing agent in the extrusion of thermoplastic elastomer foam, and particularly the extrusion of such structures. Water is a desirable blowing agent, at least in part because it is non-toxic. Known methods of water blowing thermoplastic elastomers typically introduce the water to the thermoplastic elastomer after the thermoplastic elastomer has melted. Experience with extruding thermoplastic elastomer foam using water as a blowing agent has shown that certain extrusion profiles can be extruded at a rate of 40 to 80 feet per minute.

It is known how to produce low density foams from thermoplastic elastomers using water as a blowing agent which have certain compression or deflection rates, and compression set values, and low water absorption characteristics. However, simpler methods, not requiring the post-melt introduction of water, are sought.

It is desired to have a process for forming thermoplastic elastomer foam with water as a blowing agent suitable for use at increased extrusion speeds.

It is also desired to have a process for foaming thermoplastic elastomer foam which provides better control of the cell structure and the skin characteristics.

It is also desired to have a process for forming thermoplastic elastomer foam in which the water is introduced to the extruder simultaneously with the thermoplastic elastomer.

SUMMARY OF THE INVENTION

According to one aspect of the invention, a method for extruding foam of a thermoplastic elastomer, which is a blend of olefin rubber and polyolefin resin, includes the steps of mixing the thermoplastic elastomer with water, introducing the mix to an extruder, melting and compressing the thermoplastic elastomer and water and extruding the resultant mix as foam. In more detail, a first quantity of thermoplastic elastomer in pellet form is mixed with a second quantity of water. The thermoplastic elastomer is allowed to soak for a predetermined period of time after mixing. After soaking, the mixed water and thermoplastic elastomer is introduced to an extruder. The thermoplastic elastomer is melted and mixed with the water to a uniform mix of thermoplastic elastomer and water. The mix is extruded through a die, wherein the water expands in a vapor form to create foam cells with the cells having walls of the thermoplastic elastomer.

According to another aspect of the invention, a method for extruding foam of a thermoplastic elastomer, which is a blend of olefin rubber and polyolefin resin, includes the steps of exposing the thermoplastic elastomer to steam, introducing the thermoplastic elastomer having the retained water to an extruder, melting and compressing the thermoplastic elastomer mixing it with the retained water and extruding the resultant mix as foam. As the mix is extruded through the die, the water expands in a vapor form to create foam cells with the cells having walls of the thermoplastic elastomer.

The inventive process enables the use of water as a blowing agent at increased extrusion speeds.

The inventive process enables better control of the cell structure and the skin characteristics.

The inventive process also enables the forming of thermoplastic elastomer foam in which water is introduced as a blowing agent to the extruder simultaneous with the introduction of the thermoplastic elastomer to the extruder.

DETAILED DESCRIPTION

The inventive process or method includes the following steps. Selecting a thermoplastic elastomer. Selecting an extruding device. Mixing the water with the thermoplastic elastomer. Feeding the hydrated thermoplastic elastomer into the extruder. Adjusting the speed, the temperatures and the pressure of the extruding device as required. Synchronizing the speed of the cooling conveyor with the speed of the foam exiting the extruder. Each of the steps will now be discussed in more detail.

With regard to the selection of a thermoplastic elastomer, the inventive process was developed for use with a thermoplastic elastomer of the type marketed under the name Santoprene® by Advanced Elastomer Systems, L. P. of Akron, Ohio. U.S. Pat. No. 4,130,535, which is hereby incorporated by reference, describes a thermoplastic elastomer well suited for use in the inventive method. The thermoplastic elastomer is described as a thermoplastic vulcanizate, comprising blends of olefin rubber and thermoplastic olefin resin in which the rubber is completely cured. Even though the rubber is fully cured, the blends are nevertheless processable as a thermoplastic material. Similar compounds are described in U.S. Pat. No. 4,311,628 which is also incorporated herein by reference.

Santoprene® is available in a wide range of hardness. Santoprene® is also available in both black and in neutral (colorable) form. The grades of Santoprene® used in the development of the inventive process were on the Shore A durometer scale. Santoprene® having a Shore A durometer rating or hardness of 73 was successfully used in testing of the inventive method. It should be appreciated, however, that even though testing was limited to relatively soft grades of material, the process is tunable to making foam from material ranging from Shore A 55 to Shore D 50 if desired.

With regard to mixing the thermoplastic elastomer and water, two methods are discussed herein: first, mixing thermoplastic elastomer and water with the water in liquid form; second, mixing thermoplastic elastomer and water with the water in a gaseous form, or as steam.

Figure 1:
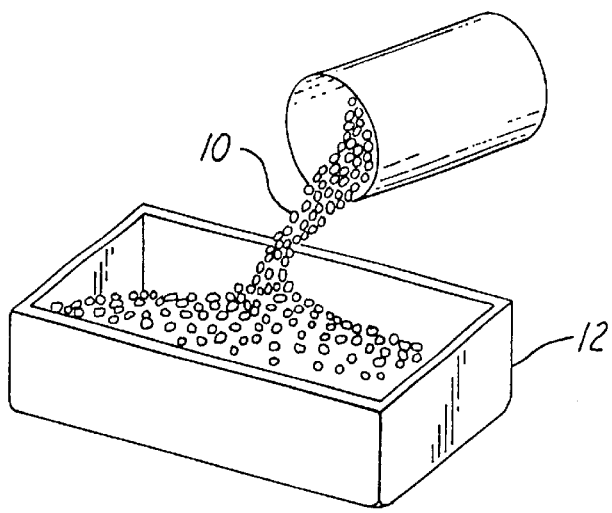
FIG. 1 is a perspective view of a tub receiving thermoplastic elastomer.
Figure 2:
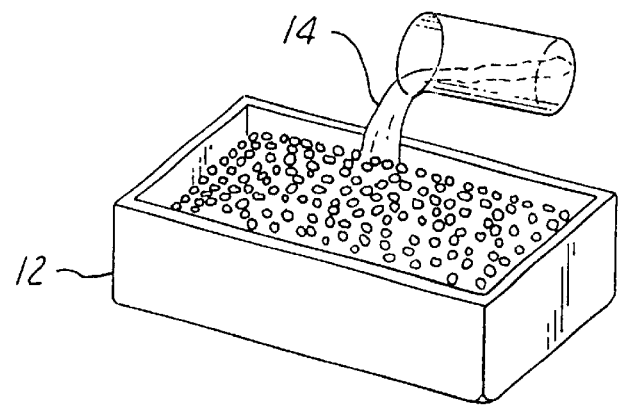
FIG. 2 is a perspective view of the tub of FIG. 1 receiving water.
Figure 3:
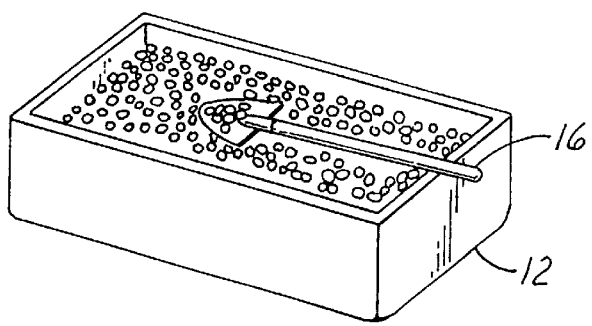
FIG. 3 is a perspective view of the tub of FIG. 2 showing a mixing operation.
Figure 4:
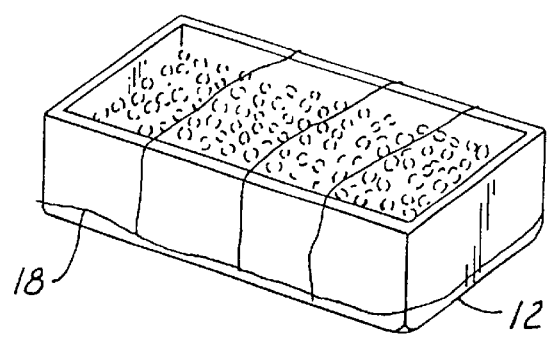
FIG. 4 is a perspective view of the tub of FIG. 3 in a sealed condition.
Figure 5:
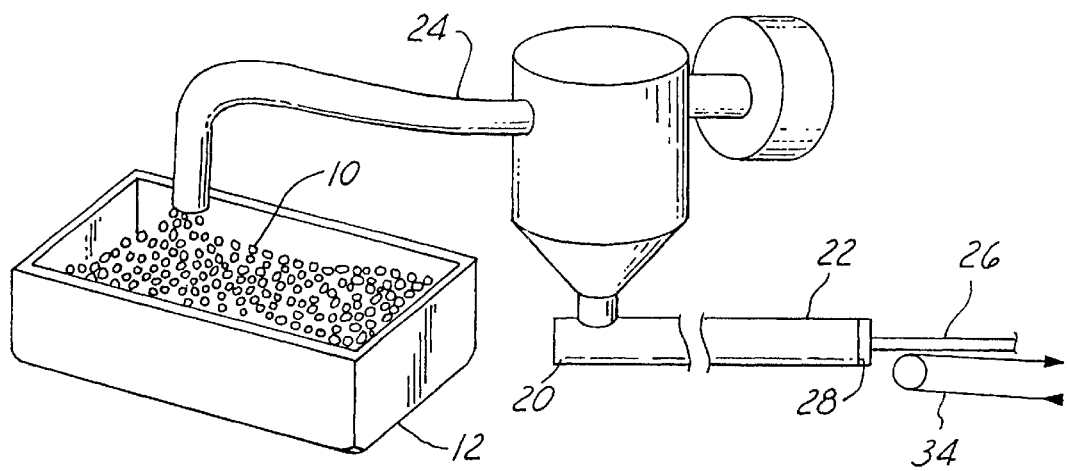
FIG. 5 is a schematic representation of an extrusion system.
Figure 6:
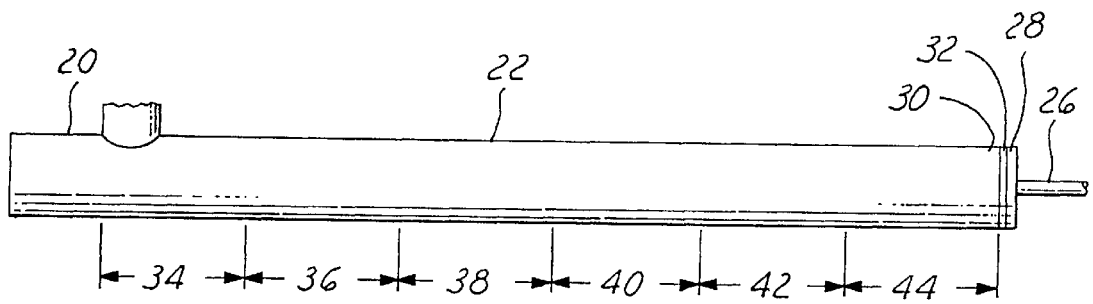
FIG. 6 is a schematic representation of the extruder of FIG. 5.

Mixing with water in its liquid form is discussed first. Predetermined quantities of thermoplastic elastomer and water are measured out and mixed. During testing, 500 pounds of thermoplastic elastomer pellets 10 were measured out into a large container or tub 12 as shown in FIG. 1 and combined with 8% by weight, or 40 pounds, of water 14 as shown in FIG. 2. However, alternative mixing methods, including continuous mixing of pellets and water are possible alternatives. Pellets 10 and water 14 are folded over using a shovel 16 as shown in FIG. 5. After mixing, the tub 12 is sealed with plastic wrap 18 or some other suitable mechanism, with some air remaining at the top of tub 12. The pellets are allowed to soak for a period of 24 hours. After 24 hours, tub 12 is unsealed and the pellets and water are again mixed, being folded over with shovel 16 so that very little standing water remains in tub 12. The wet pellets are then drawn from tub 12 and fed into a first end 20 of an extruder 22 by a vacuum type device 24. Some water is lost from extruder 22, escaping past seals at first end 20 of the extruder. It was noted that increasing the percent by weight of water combined with the pellets increased the amount of water escaping past the seals of the extruder, but did not substantially change the characteristics of the foam extruded. Decreasing the amount of water to a much lower level, such as 2%, appeared to have a deleterious effect on the characteristics of the foam extruded.

Some tests were also run with 2.5% by weight of mica added to the mix as a nucleating agent.

Other tests where run with gas producing chemicals or chemical blowing agents being added to the water and pellet mix. The chemicals can be added in powder or pellet form and are supplied in polypropelene carriers. The gas producing chemicals have been of both the endothermic type and the exothermic type. Both types of chemicals are available from the Boehringer Ingelheim Chemical Company, Specialty Products Division. Hydrocerol is the name under which the endothermic chemicals are sold. Some foam samples were made with exothermic additive, others with endothermic additives and yet others with both endothermic and exothermic additives. The addition appeared to provide a finer cell structure.

Also, it would be possible to introduce a pressurized gas as a blowing agent to the water and thermoplastic elastomer within the extruder, preferably after the thermoplastic elastomer has melted. Extruder 22 is a single screw extruder having a barrel length to diameter ratio of approximately 30:1, and compresses and melts the thermoplastic elastomer. Extruder 22 receives material at the first end 20. Extruded foam 26 passes through a die 28 at a second end 30 of extruder 22. Die 28 helps control the cross sectional shape of the extruded foam 26. A screen pack 32 is placed at second end 30 extruder just before die 28 and serves to both filter the extruded material and to raise the pressure within the extruder adjacent to die 28. The combination of screens and the precise mesh sizes chosen for use in screen pack 32 can be varied to alter the pressure in front of die 28 as required. The temperature within extruder 22 and the rotational speed of the extruder screw (not shown) can also be varied to control flow rate and pressure. The pressure of the die can vary from 250 psi to 2500 psi depending on the shape and cross sectional area of the die. The speed at which foam leaves the extruder is largely a function of the pressure at the die. Pressure and screw speed are varied as required to control the dimensions of the extruded foam and the cell structure and skin characteristics, including the skin thickness, of the foam.

The extruder screw is preferably operated at 10 to 25 rpm for many of the foams made. However, foam can be formed at screw speeds varying anywhere from at least 1 to at least 60 rpm.

The extruder is divided into six temperature zones. The first temperature zone 34 is where the mix of water and thermoplastic enters the extruder. Temperature zones 36, 38, 40, 42 and 44 are between zone 34 and second end 30. Each temperature zone has independent heating and cooling devices for varying the temperature within each zone as desired. Cooling is commonly provided by water or air or oil flow while heat is provided by electro-resistive devices or oil flow. Exemplary temperatures are provided in the example cited below. The temperatures of a gate area between die 28 and second end 32 is also controlled by a heating mechanism. Because there is typically no need to cool die 28, a cooling mechanism was not used, although should one be desired, one could be integrated into die 28.

The objective of controlling the melt temperature at the point of extrusion is to obtain a melt temperature near die 28 low enough to get good strength but not so low that the melt has difficulty passing through screen 32 and die 28. Heating die 28 melts the extrusion at its outermost surface, providing a smooth skin over the extrusion for protection against water intrusion and wear. Pressure of the melted thermoplastic elastomer proximate to die 28 is adjusted to an optimal level. The rate in units of length per units of time of material which can be extruded from the second end of the extruder is a function of many factors including the rotational speed of the screw and the cross sectional area of the die. It is necessary to synchronize the speed of a take-off conveyer 34 which receives the extruded foam 26 to the speed of the foam 26 leaving the extruder 22. The take-off conveyer 34 is used to cool foam 26 and is run at speeds from approximately 100 to 200 feet per minute, depending on the precise characteristics of the profile being extruded. This is a substantial improvement over the rate of 40 to 80 feet per minute for the prior art processes. Extrusion at yet higher rates of speed is possible, but was not done because of equipment limitations.

It has been determined that if water content is over approximately 6% by weight of the thermoplastic elastomer, some of the water will drain from the extruder if the extruder is not watertight. It becomes undesirable to use a watertight extruder as water content increases beyond 6%. When water content reaches approximately about 8% by weight, and a watertight extruder is employed, the extrusion process becomes unstable and the ability to control the process is lost.

The following is an exemplary use of the above described method. Five hundred pounds of Santoprene® material having a Shore A hardness of 73 is mixed with 40 pounds (8% by weight) of water in tube 12. The water 14 and pellets 10 are folded over with shovel 16. Tub 12 is sealed. After a 24 hour soak, pellet 10 and water 14 are again mixed. The mixture, at 73 degrees Fahrenheit, is fed into extruder 22. Screen pack 32 includes a breaker plate with one course screen. The extruder temperature zones are maintained at the following temperatures:

| Zone | Temperature (Degrees Fahrenheit) |
| --- | --- |
| 1 | 200 |
| 2 | 210 |
| 3 | 330 |
| 4 | 380 |
| 5 | 380 |
| 6 | 380 |
| Gate | 385 |
| Die | 420 |

The extruder's screw is rotated at 35 rpm. The extruded foam 26 leaves extruder 22 at a rate of 195 feet per minute. The pressure proximate to the die is 625 psi. The resultant profile of the foam is approximately ¼" by ⅜". A 1" length specimen of the extruded profile was, after cooling, loaded to achieve a 50% deflection. Approximately 1.52 pounds of force was needed to compress the 1" length specimen from 0.256" to approximately 0.128".

Mixing thermoplastic elastomer and water with the water in a vapor form is now discussed.

The thermoplastic elastomer is mixed with water in vapor form by exposing pellets 10 to steam. For the purpose of development testing and evaluation, the mixing was done in a batch processing fashion, which is described below. However, it is anticipated that in production it will be beneficial to use a continuous flow process to steam the thermoplastic elastomer. Pellets 10 could be passed through a steam chamber (not shown) and then fed to an extruder.

Figure 7:
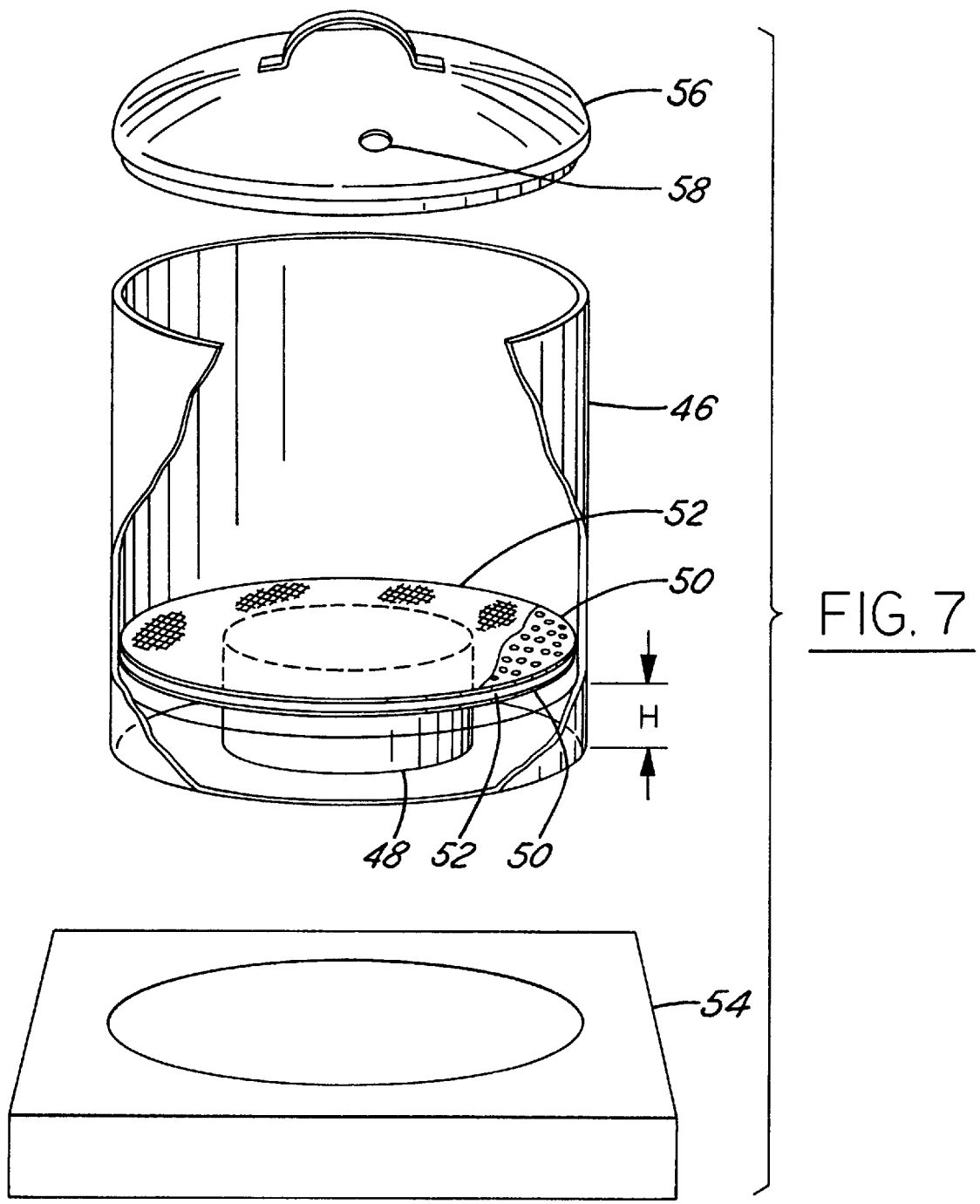
FIG. 7 is a partial cutaway view of a steaming pot, together with a lid and a heating element.

To steam the thermoplastic elastomer, a large steaming pot 46, as might be used for pressure cooking and shown in FIG. 7, is filled with water to a height H of approximately 6 inches. A cylindrical support ring 48 is centered in the bottom of pot 46. A first round perforated pan 50 having a fine mesh screen 52 disposed there over is placed on top of ring 48. A second round perforated pan 50 having a fine mesh screen 52 disposed there over is placed over first perforated pan 50 and screen 52. The plates 50 are of substantially the same outer diameter as an inner diameter of pot 46 so as to prevent pellets 10 from dropping into the water.

Figure 8:
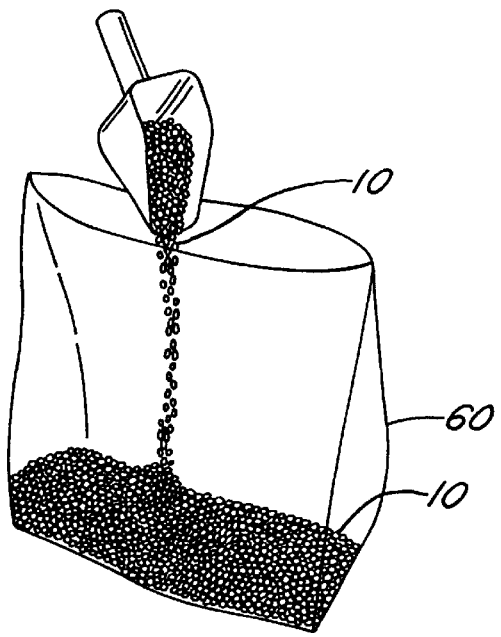
FIG. 8 is a perspective view of a plastic bag receiving thermoplastic elastomer.
Figure 9:
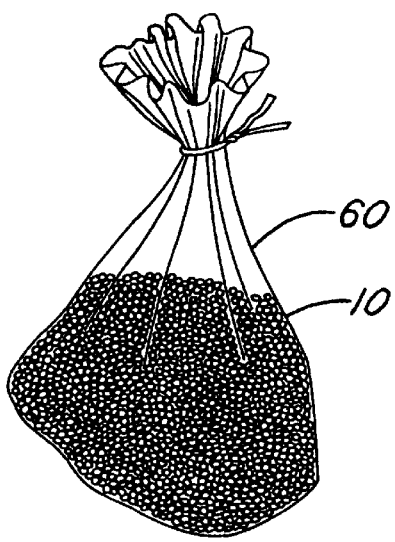
FIG. 9 is a perspective view of the plastic bag of FIG. 8 in a sealed condition.

Pot 48 is placed over a heating element 54. When the water reaches boiling temperature, and the liquid water is being converted to steam, pellets 10 are introduced to pot 46. Sufficient pellets 10 are added to fill pot 46. Pans 50 are held sufficiently high by ring 48 that none of pellets 10 are immersed in the boiling water. Pot 46 is then covered with a lid 56 and pot 46 monitored until steam begins to flow from a hole 58 in lid 56. At the moment steam begins to flow from hole 58, a timer is started. At the end of a predetermined period of time, ten minutes in one preferred embodiment of the invention, pellets 10 are removed and placed in a container 60, such as a plastic bag 60 as shown in FIG. 8, and then sealed as shown in FIG. 9. The size and precise character of container 60 may be varied with the quantity of pellets 10. The next batch of pellets 10 are added to pot 46, and the steaming process repeated until the desired quantity of pellets 10 is steamed. The temperature of the steam within pot 46 is varied by controlling the pressure within pot 46.

In the course of testing, samples were prepared at several temperatures and pressures. Initial data indicates that, employing the above described method of steaming pellets 10, steaming pellets at 212° F. and atmospheric pressure results in more water retention than steaming pellets 10 at 250° F. and correspondingly elevated pressure. It should be appreciated that the terms "water retention" and "retained water" as used herein includes both water absorbed and absorbed by pellets 10.

Subsequent to steaming, but prior to introducing pellets 10 to extruder 22, samples of pellets are tested for water content. A Max-50 Moisture Analyzer™ (not shown) is used to determine the amount of water retained by the selected pellets 10. The Analyzer weighs the sample, subjects the sample to heat to drive out the retained water, reweighs the sample and compares the weight of the now dry sample to the original weight to arrive at a value for the percent of moisture of the original sample. A relatively small amount of material, only about seven grams, is required for such testing.

It has been determined that a preferred amount of retained water is in the range of 3% to 6.75%, and is preferably in the range of 4% to 5%.

It should be appreciated that with increased experience with batch processing or continuous flow processing, the need to check for the water content in pellets should be reduced and potentially eliminated once a preferred amount of water retention is decided upon. Instead, the variables which control the amount of water retained by pellets 10 would be closely monitored and controlled.

The steamed pellets 10 are suitable for making foam immediately after steaming. However, it was determined that allowing pellets 10 to soak or age in the sealed containers for approximately 24 hours or more had a beneficial effect on the foaming characteristics of the thermoplastic elastomer. Additional improvement was seen after 48 hours of aging, and slightly more improvement after two weeks of aging. When left in a sealed container, water in liquid form collects at the bottom of the container, so that the distribution of water throughout the container becomes uneven.

Figure 10:
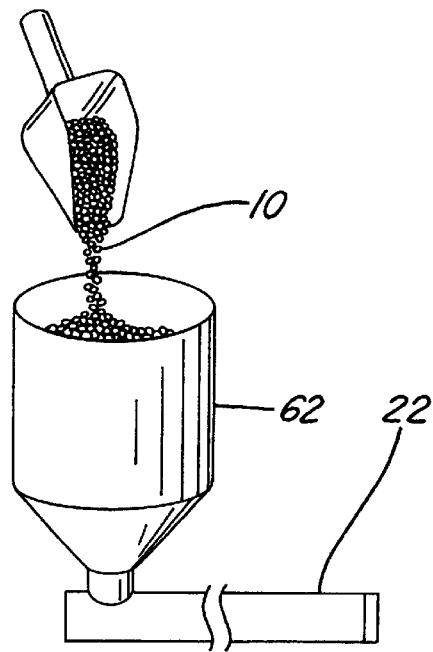
FIG. 10 is a schematic representation of an extrusion system being manually fed thermoplastic elastomer.

Foam having a specific gravity of 0.17 was formed from Santoprene® grade 201-73, having a Shore A hardness of 73, in the following manner. First, the pellets 10 were steamed to achieve a retained water content of 4%. The pellets 10, in this example, were aged for approximately 14 days before being employed. The hydrated or water retaining pellets were introduced to the extruder via a hopper 62 as shown in FIG. 10. The entire contents of the container 60, including any liquid water which may have collected at the bottom, were fed into hopper 62.

The extruder zones in this exemplary embodiment were maintained at the following temperatures:

| Zone | Temperature (Degrees Fahrenheit) |
| --- | --- |
| 1 | 200 |
| 2 | 220 |
| 3 | 310 |
| 4 | 380 |
| 5 | 375 |
| 6 | 370 |
| Gate | 380 |
| Die | 480 |

Figure 11:
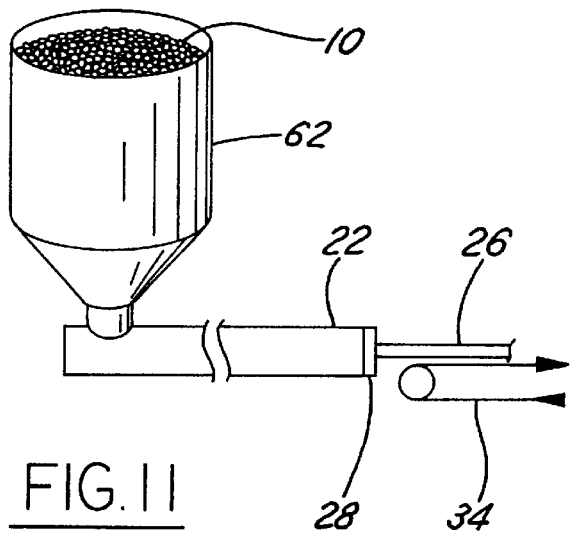
FIG. 11 is a schematic representation of an extrusion system extruding foam.

The extruder's screw was rotated at 30 rpm. The extruded foam 26 left extruder 22 at a rate of 120 feet per minute as shown in FIG. 11. The pressure proximate to die 28 was 500 psi. The resultant profile of the foam was D-shaped and approximately ¼ inch by ⅜ inch. A 1 inch length specimen of the extruded profile was, after cooling, loaded to achieve a 50% deflection. Approximately 1.70 pounds of force was needed to compress the 1 inch length specimen by 50%.

It is to be understood that the above detailed description and example are merely exemplary in nature. Many variations from the detailed description and the example are possible within the scope of the present invention. For example, materials of widely different durometers may be employed. Different mixing methods may be used to combine the water with the thermoplastic pellets. The amount of time that the pellets are allowed to soak or age may be varied or potentially even eliminated. Indeed, it may be possible to entirely eliminate the soaking period. Different amounts of water may be used. Different extruder lengths may be employed. Different screw speeds may be used in the extruder. Different feed rates may be employed. More or fewer temperature zones may be used on the extruder. The temperature within the different zones may be varied from those cited in the example. It is therefore to be understood that the scope of the invention is determined by the scope of the appended claims.

We claim:

1. A method for extruding foam of a thermoplastic elastomer, the thermoplastic elastomer including a blend of olefin rubber and polyolefin resin, the method comprising the steps of:

mixing a first quantity of the thermoplastic elastomer in pellet form with a second quantity of water and allowing the thermoplastic elastomer to soak for a predetermined period of time after mixing;

introducing the mixed water and thermoplastic elastomer to an extruder;

melting and compressing the thermoplastic elastomer and mixing with the water within the extruder to a uniform mix of thermoplastic elastomer and water;

extruding the mix through a die wherein the water expands in a vapor form to create foam cells with the cells having walls of the thermoplastic elastomer.

2. A method for extruding foam of a thermoplastic elastomer, the thermoplastic elastomer including a blend of olefin rubber and polyolefin resin, the method comprising the steps of:

exposing a first quantity of the thermoplastic elastomer in pellet form to steam to increase an amount of water retained by the thermoplastic elastomer;

introducing the thermoplastic elastomer having the retained water to an extruder;

melting and compressing the thermoplastic elastomer and mixing with the retained water within the extruder to a uniform mix of thermoplastic elastomer and water;

extruding the mix through a die wherein the water expands in a vapor form to create foam cells with the cells having walls of the thermoplastic elastomer.

3. A method for extruding foam as claimed in claim 1 wherein:

the thermoplastic elastomer is elevated to a temperature substantially equal to a temperature of the steam.

4. A method for extruding foam as claimed in claim 2 wherein:

the thermoplastic elastomer is exposed to the steam for a predetermined period of time.

5. A method for extruding foam as claimed in claim 2 wherein:

the thermoplastic elastomer and the retained water are placed in a sealed container for a predetermined period of time prior to introducing the thermoplastic elastomer and retained water to the extruder.

6. A method for extruding foam as claimed in claim 5 wherein:

the predetermined period of time is at least approximately 24 hours.

7. A method for extruding foam as claimed in claim 2 wherein:

the amount of retained water is in a range of between approximately 3% to 6.75%.

8. A method for extruding foam as claimed in claim 7 wherein:

the amount of retained water is in a range of between approximately 4% to 5%.

* * * * *